(12) United States Patent
Guo et al.

(10) Patent No.: US 12,234,309 B1
(45) Date of Patent: Feb. 25, 2025

(54) HIGH-TEMPERATURE-RESISTANT DEEP PENETRATION MOLECULAR MEMBRANE ACID COPOLYMERS AND PREPARATION METHODS THEREOF

(71) Applicants: CHENGDU LEPS TECHNOLOGY CO., LTD., Sichuan (CN); SOUTHWEST PETROLEUM UNIVERSITY, Sichuan (CN)

(72) Inventors: Jianchun Guo, Chengdu (CN); Bin Liu, Chengdu (CN); Bo Gou, Chengdu (CN); Shan Ren, Chengdu (CN); Shaobin Zhang, Chengdu (CN); Yang Lu, Chengdu (CN); Qingsong Guo, Chengdu (CN); Mingyuan Zhou, Chengdu (CN); Yangyi Xing, Sichuan (CN); Jichuan Ren, Chengdu (CN); Hao Ou, Chengdu (CN); Gang Li, Chengdu (CN)

(73) Assignees: CHENGDU LEPS TECHNOLOGY CO., LTD., Chengdu (CN); SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/744,695

(22) Filed: Jun. 16, 2024

(30) Foreign Application Priority Data

Apr. 2, 2024 (CN) .......................... 202410389925.3

(51) Int. Cl.
  *C08F 230/02* (2006.01)
  *B01D 71/52* (2006.01)
  *C08L 43/02* (2006.01)

(52) U.S. Cl.
  CPC .......... *C08F 230/02* (2013.01); *B01D 71/521* (2022.08); *C08L 43/02* (2013.01);
  (Continued)

(58) Field of Classification Search
  None
  See application file for complete search history.

(56) References Cited

U.S. PATENT DOCUMENTS

| 2003/0054146 A1 | 3/2003 | Kim et al. |
| 2023/0137416 A1 | 5/2023 | Shanmugam et al. |

FOREIGN PATENT DOCUMENTS

| CN | 103819609 A | 5/2014 |
| CN | 104497220 A | 4/2015 |

(Continued)

OTHER PUBLICATIONS

CN-107129558-A, Sep. 5, 2017, machine translation (Year: 2017).*

(Continued)

*Primary Examiner* — Satya B Sastri
(74) *Attorney, Agent, or Firm* — PORUS IP LLC

(57) ABSTRACT

The present disclosure provides a high-temperature-resistant deep penetration molecular membrane acid copolymer and a preparation method thereof. The copolymer is formed by polymerizing four raw monomers including 2-acrylamido-2-methylpropanesulphonic acid, vinyl phosphonic acid, alkyl dimethylallyl ammonium chloride, and perfluoropolyether acrylate. The method comprises: S1: mixing and stirring solvent oil, an emulsifier, the alkyl dimethyl allyl ammonium chloride, and the perfluoropolyether acrylate to be dispersed homogeneously to obtain an oil phase; S2: mixing and stirring the 2-acrylamido-2-methylpropanesulphonic acid, the vinyl phosphonic acid, a complexing agent, and distilled water, and adjusting pH to obtain an aqueous phase; S3: slowly dropwise adding the aqueous phase to the oil phase; and S4: introducing nitrogen into the water-in-oil emulsion to remove oxygen, then adding an initiator and carrying out a heating polymerization reaction to obtain copolymer emulsion (i.e., a molecular membrane agent).

(Continued)

The copolymer emulsion is added to an acid solution to obtain molecular membrane acid.

6 Claims, 8 Drawing Sheets

(52) U.S. Cl.
CPC .. *B01D 2323/217* (2022.08); *B01D 2323/219* (2022.08); *B01D 2323/40* (2013.01)

(56) References Cited

FOREIGN PATENT DOCUMENTS

| | | | |
|---|---|---|---|
| CN | 105001849 A | | 10/2015 |
| CN | 105693947 A | | 6/2016 |
| CN | 106146728 A | | 11/2016 |
| CN | 106928408 A | | 7/2017 |
| CN | 107129558 A | * | 9/2017 ................ C08F 2/10 |
| CN | 110483690 A | | 11/2019 |
| CN | 110564398 A | | 12/2019 |
| CN | 113024720 A | | 6/2021 |
| CN | 116675808 A | | 9/2023 |
| CN | 116789894 A | | 9/2023 |
| CN | 116925285 A | | 10/2023 |
| CN | 117025195 A | | 11/2023 |
| CN | 117701268 A | | 3/2024 |
| GB | 2133021 B | | 8/1986 |
| WO | 2024051495 A1 | | 3/2024 |

OTHER PUBLICATIONS

First Office Action in Chinese Application No. 202410389925.3 mailed on May 9, 2024, 13 pages.
Decision to Grant a Patent in Chinese Application No. 202410389925.3 mailed on May 21, 2024, 4 pages.
Guo, Jianchun et al., Advance and Prospect of Acid Fracturing in Deep Carbonate Reservoirs, Drilling and Production Technology, 47(2): 121-129, 2024.
Shen, Xin et al., Effect of carbon chain lengths of cationic surfactant on inhibition rate of acid-rock reaction, Journal of Petroleum Science and Engineering, 196: 1-8, 2021.
Meng, Jianxun et al., Development and performance study of an environmentally friendly acidizing solution, Oil Production Engineering, 2019, 5 pages.
Li, Huan, Development of Low Viscosity Adsorption Acidizing Solution Retarding Admixtures, China Master's Theses Full-text Database, Engineering Science and Technology I, 2016, 66 pages.
Quan, Hongping et al., Copolymer MCJS as a Retarder of the Acid-Rock Reaction Speed for the Stimulation of Deep Carbonate Reservoirs, Journal of Applied Polymer Science, 2014, 8 pages.
Quan, Hongping et al., The effect of hydrophobic chains on retarding performance of retarding acids, Royal Society of Chemistry Advances, 2022, 10 pages.

* cited by examiner

HIGH-TEMPERATURE-RESISTANT DEEP PENETRATION MOLECULAR MEMBRANE ACID COPOLYMERS AND PREPARATION METHODS THEREOF

CROSS-REFERENCE TO RELATED APPLICATION

This application claims priority to Chinese Patent Application No. 202410389925.3, filed on Apr. 2, 2024, the entire contents of which are incorporated herein by reference.

TECHNICAL FIELD

The present disclosure relates to the technical field of retarded acid materials, and in particular to a high-temperature-resistant deep penetration molecular membrane acid copolymer and a preparation method thereof.

BACKGROUND

Acidizing is considered to be one of the important measures for production enhancement in carbonate reservoirs, which utilizes chemical solvency and hydrodynamic action to unblock the oil reservoir blockage and improve pore and fracture conductivity, thus increasing the production of oil and gas wells. However, after conventional acid enters the stratum, the $H^+$ in the acid will be consumed in large quantities, resulting in a shortening of the effective distance of the acid in the stratum. In order to improve the efficiency of acid stimulation treatment in high-temperature carbonate reservoirs, a superior retarded acid system with high temperature stability, controllable reaction rates, and acceptable corrosion losses is required.

Early retarded acid systems mainly include gelling acid, crosslinking acid, emulsified acid, foam acid, etc. The gelling acid and the crosslinking acid improve the viscosity of the acid system mainly through a polymer thickening agent or crosslinking, reducing the rate of $H^+$ mass transfer, thereby reducing the acid rock reaction rate. However, due to curling and fracture of polymer molecular chains under high temperature and high shear condition, the viscosity of the gelling acid system is reduced, reducing the ability to retard the acid rock reaction rate. In addition, these polymer molecules may cause some harm to the oil and gas reservoirs, reducing the permeability of the reservoirs. The emulsified acid and the foam acid slow down the acid rock reaction rate by mainly wrapping the acid with the two-phase emulsion or foam, which has poor stability at high temperature, high viscosity, high frictional resistance, difficulties in residual acid flowback, or other disadvantages.

Therefore, it is desirable to provide a high-temperature-resistant deep penetration molecular membrane acid copolymer and a preparation method thereof, which are capable of overcoming the above mentioned disadvantages associated with conventional retarded acids, retarding the acid rock reaction rate, and being applicable to a relatively high temperature environment.

SUMMARY

One or more embodiments of the present disclosure provide a high-temperature-resistant deep penetration molecular membrane acid copolymer. The high-temperature-resistant deep penetration molecular membrane acid copolymer may have the following structural formula:

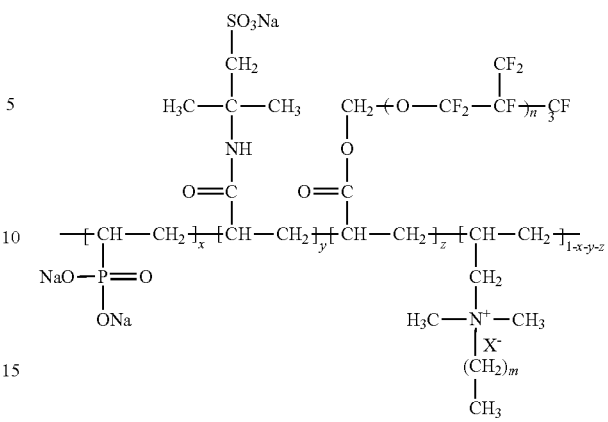

wherein x may be within a range of 0.01-0.22, y may be within a range of 0.78-0.98, z may be within a range of 0.004-0.007, and $x+y+z<1$; X denotes one of Cl, Br, and I, n denotes one of 1, 2, and 3, and m denotes one of 11, 13, 15, and 17.

In some embodiments, in the high-temperature-resistant deep penetration molecular membrane acid copolymer, X may be Cl, n may be 2, and m may be 17.

One or more embodiments of the present disclosure provide a preparation method of the high-temperature-resistant deep penetration molecular membrane acid copolymer. The preparation method may comprise: S1: mixing and stirring solvent oil, an emulsifier, alkyl dimethylallyl ammonium chloride, and perfluoropolyether acrylate to be dispersed homogeneously to obtain an oil phase; S2: mixing and stirring 2-acrylamido-2-methylpropanesulphonic acid, vinyl phosphonic acid, a complexing agent, and distilled water, and adjusting pH to 8 to obtain an aqueous phase; S3: slowly dropwise adding the aqueous phase to the oil phase while stirring at a speed of 600 r/min, finishing dropwise adding within 30 min, and continuously stirring until water-in-oil emulsion is formed; and S4: adjusting the speed to 400-600 r/min, introducing nitrogen into the water-in-oil emulsion to remove oxygen, then adding an initiator solution, and controlling reaction temperature to be within a range of 40° C.-60° C. to react for 2-10 h to obtain copolymer emulsion. A molar percentage of each of four raw monomers may be as follows: 78%-98% of 2-acrylamido-2-methylpropanesulfonic acid, 1%-22% of vinyl phosphonic acid, 0.4%-0.7% of perfluoropolyether acrylate, and 0.1%-0.3% of alkyl dimethylallyl ammonium chloride. A sum of the molar percentages of the four raw monomers may be equal to 100%. The initiator may be a water-soluble azo initiator or a redox system including persulfate and sodium hydrogen sulfite, and the initiator may account for 0.2-0.5% of a total mass of the four monomers. The emulsifier may be a compound emulsifier composed of an emulsifier A and an emulsifier B in a mass ratio of (2-4):1. The emulsifier A may be one of sorbitan monooleate (span-80), sorbitan monostearate (span-60), propylene glycol monostearate (BPMS), and propylene glycol monolaurate (BPML). The emulsifier B may be one of sorbitan laurate (span-20), fatty alcohol polyoxyethylene ether (AEO-4), polyoxyethylene octyl phenol ether-10 (OP-10), polysorbate-20 (Tween-20), and polysorbate-60 (Tween-60). A total mass of the compound emulsifier may account for 4%-5% of a total mass of the water-in-oil emulsion.

In some embodiments, the solvent oil may be one or more of diesel oil, D60 solvent oil, D80 solvent oil, and white oil, and an amount of the solvent oil may account for 20%-40% of a total mass of the water-in-oil emulsion.

In some embodiments, a total mass of the four monomers may account for 34%-39% of the total mass of the water-in-oil emulsion.

In some embodiments, the complexing agent may be one of ethylene diamine tetraacetate, ethylenediamine tetramethylenephosphonate (EDTMP), sodium ammonia triacetate, and diethylenetriamine pentacarboxylate. A mass of the complexing agent may account for 0.1% of the total mass of the water-in-oil emulsion.

One or more embodiments of the present disclosure provide an application of a high-temperature-resistant deep penetration molecular membrane acid copolymer prepared by the preparation method. The copolymer emulsion prepared in the operation S4 may be used as a molecular membrane agent. The molecular membrane agent may be added to an acid solution to prepare molecular membrane acid. A mass percentage concentration of the molecular membrane agent in the molecular membrane acid may be within a range of 1%-4.0%.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
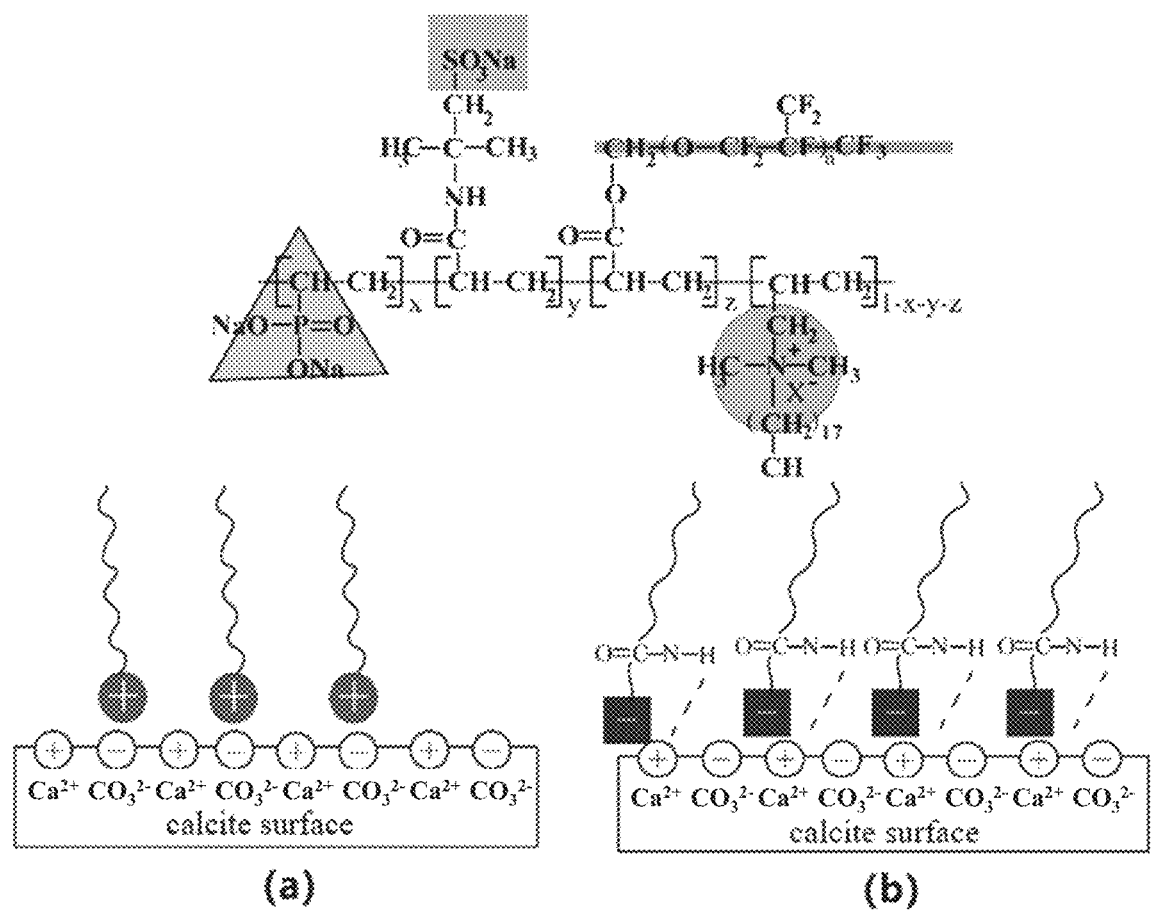
FIG. 1 is a schematic diagram illustrating actions of groups in molecules of a molecular membrane acid copolymer according to some embodiments of the present disclosure.
Figure 1:
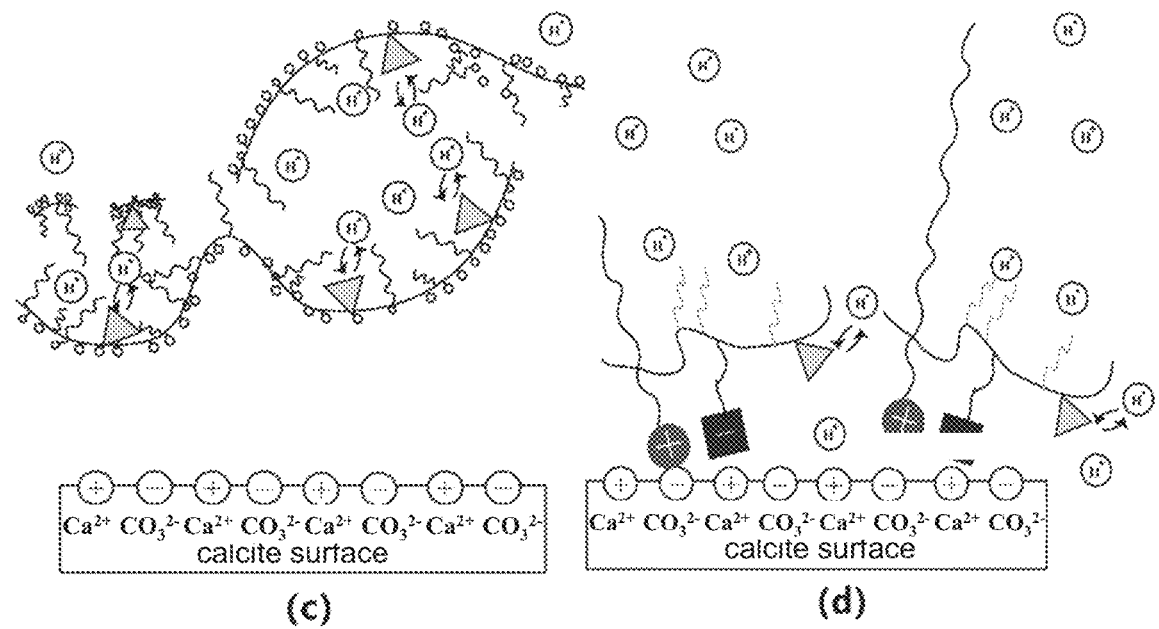

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person having ordinary skills in the art to apply the present disclosure to other similar scenarios in accordance with these drawings without creative labor. Unless obviously obtained from the context or the context illustrates otherwise, the same numeral in the drawings refers to the same structure or operation.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

Preferred embodiments of the present disclosure are described below in conjunction with the accompanying drawings. It should be understood that the preferred embodiments described herein are intended to illustrate and explain the present disclosure only, and are not intended to limit the present disclosure.

A retarded acid material, i.e., a retarded acid system, refers to an acidizing material used in petroleum extraction, which is mainly used to retard an acid rock reaction rate to improve the acidizing effect and reduce damage to the stratum. At present, the research on the materials used for the retarded acid is still limited by the temperature, and the existing retarded acid materials are difficult to be applied to a relatively high temperature environment. In addition, the polymer materials used for the existing retarded acids have difficulty in degradation and high residue content.

The embodiments of the present disclosure provide a high-temperature-resistant deep penetration molecular membrane acid copolymer and a preparation method thereof. The method may utilize copolymer emulsion as a molecular membrane agent to prepare the high-temperature-resistant deep penetration molecular membrane acid copolymer.

One or more embodiments of the present disclosure provide a high-temperature-resistant deep penetration molecular membrane acid copolymer. The high-temperature-resistant deep-penetrating molecular membrane acid copolymer may have the following structural formula:

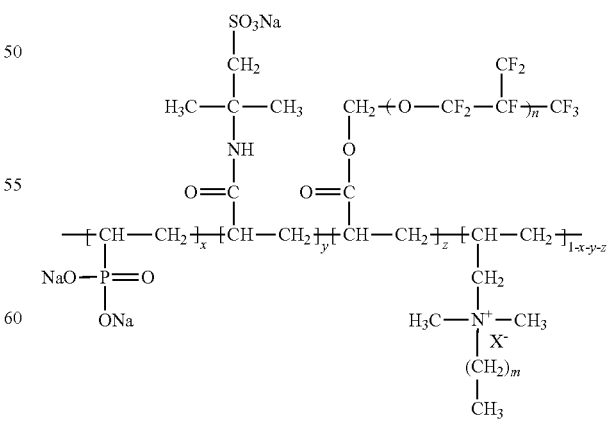

wherein x may be within a range of 0.01-0.22, y may be within a range of 0.78-0.98, z may be within a range of 0.004-0.007, and x+y+z<1; X denotes one of Cl, Br, and I, n denotes one of 1, 2, and 3, and m denotes one of 11, 13, 15, and 17.

In some embodiments, in the high-temperature-resistant deep penetration molecular membrane acid copolymer X may be Cl, n may be 2, and m may be 17.

In some embodiments, the preparation method of the high-temperature-resistant deep penetration molecular membrane acid copolymer may perform inverse emulsion polymerization based on four raw monomers including 2-acrylamido-2-methylpropanesulphonic acid, vinyl phosphonic acid, alkyl dimethylallyl ammonium chloride, and perfluoropolyether acrylate.

The inverse emulsion polymerization refers to emulsion polymerization in which a polar aqueous solution is used as a dispersion phase and a non-polar organic solvent is used as a continuous phase, and water-in-oil emulsion is formed under the action of an emulsifier. When a stirring rate is large enough, a water-soluble monomer is dispersed into micro- and-nano-scale droplets, which are stabilized by the emulsifier. In this case, a total surface area of the monomer is larger and the monomer is easier to bind free radicals. Therefore, compared with other polymerization methods, the inverse emulsion polymerization has characteristics of fewer side reactions and faster polymerization rate. An emulsion particle size of the inverse emulsion polymerization is small, so that the thermal effect of the polymerization is small, the temperature is easy to control, and the reaction conditions are mild, thereby making the inverse emulsion polymerization widely used in various polymerization reaction systems. In some embodiments, the preparation method of the high-temperature-resistant deep penetration molecular membrane acid copolymer may include the following operations.:

S1: solvent oil, an emulsifier, the alkyl dimethylallyl ammonium chloride, and the perfluoropolyether acrylate may be mixed and stirred to be dispersed homogeneously to obtain an oil phase.

The solvent oil refers to an organic solvent that is widely used in industrial and chemical applications. The solvent oil may be used as a dispersion medium in the inverse emulsion polymerization for dispersing the monomer droplets and dissipating polymerization heat.

In some embodiments, the solvent oil may be one or more of diesel oil, D60 solvent oil, D80 solvent oil, and white oil.

In some embodiments, the solvent oil may be one or more of 0 # diesel oil, −5 # diesel oil, −10 # diesel oil, −20 # diesel oil, D60 solvent oil, D80 solvent oil, 5 # white oil, 10 # white oil, and 15 # white oil.

In some embodiments, an amount of the solvent oil may account for 20%-40% of a total mass of water-in-oil emulsion formed in an operation S3.

In some embodiments, the solvent oil may be preferably 10 # white oil, and a mass of the 10 # white oil may account for 26%-39% of the total mass of the water-in-oil emulsion formed in the operation S3.

The emulsifier refers to a surfactant that enables two or more immiscible liquids to form stable emulsion. In the inverse emulsion polymerization, the emulsifier may bind to the droplets to form a protective membrane, preventing coalescence and enabling the formation of stable emulsion from water and oil. Formed micelles may solubilize the monomers, providing a stable environment for the polymerization.

In some embodiments, an emulsifier A may be one of sorbitan monooleate (span-80), sorbitan monostearate (span-60), propylene glycol monostearate (BPMS), and propylene glycol monolaurate (BPML); and an emulsifier B may be one of sorbitan laurate (span-20), fatty alcohol polyoxyethylene ether (AEO-4), polyoxyethylene octyl phenol ether-10 (OP-10), polysorbate-20 (Tween-20), and polysorbate-60 (Tween-60).

In some embodiments, the emulsifier may be a compound emulsifier composed of the emulsifier A and the emulsifier B in a mass ratio (2-4):1.

In some embodiments, the emulsifier A may be the span-80, the emulsifier B may be the OP-10, and the compound emulsifier may be composed of the span-80 and the OP-10 in a mass ratio of 2:1, 3:1, 4:1, preferably 3:1.

In some embodiments, a total mass of the compound emulsifier may account for 4%-5% of the total mass of the water-in-oil emulsion formed in the operation S3.

In some embodiments, the compound emulsifier may account for 4% and 5%, preferably 4% of the total mass of the water-in-oil emulsion formed in the operation S3.

In some embodiments, the alkyl dimethylallyl ammonium chloride may be one of octadecyl dimethylallyl ammonium chloride, cetyl dimethylallyl ammonium chloride, tetradecyl dimethylallyl ammonium chloride, and dodecyl dimethylallyl ammonium chloride, preferably the octadecyl dimethylallyl ammonium chloride.

In some embodiments, the perfluoropolyether acrylate may be one of mono-polyfluoroether acrylate, dipolyfluoroether acrylate, and tripolyfluoroether acrylate, preferably the dipolyfluoroether acrylate.

In some embodiments, molar percentages of the amounts of the four raw monomers may be as follows: 78%-98% of 2-acrylamido-2-methylpropanesulfonic acid, 1%-22% of vinyl phosphonic acid, 0.4%-0.7% of perfluoropolyether acrylate, and 0.1%-0.3% of alkyl dimethylallyl ammonium chloride. A sum of the molar percentages of the four raw monomers may be equal to 100%.

In some embodiments, the molar percentages of the 2-acrylamido-2-methylpropanesulphonic acid, the alkyl dimethylallyl ammonium chloride and the vinyl phosphonic acid may be 78:21.3:0.2:0.5, 82:17.3:0.2:0.5, 88:11.3:0.2: 0.5, 92:7.3:0. 2:0.5, 98:1.3:0.2:0.5, 88:11.3:0.1:0.6, 88:11.3: 0.3:0.4, preferably 88:11.3:0.2:0.5.

In some embodiments, the total mass of the alkyl dimethylallyl ammonium chloride, the perfluoropolyether acrylate, the 2-acrylamido-2-methylpropanesulphonic acid, and the vinyl phosphonic acid may account for 34%-39% of the total mass of the water-in-oil emulsion formed in the operation S3.

In some embodiments, the total mass of the alkyl dimethylallyl ammonium chloride, the perfluoropolyether acrylate, the 2-acrylamido-2-methylpropanesulphonic acid, and the vinyl phosphonic acid may account for 34.16% of the total mass of the water-in-oil emulsion formed in the operation S3.

S2: The 2-acrylamido-2-methylpropanesulphonic acid, the vinyl phosphonic acid, a complexing agent, and distilled water may be mixed and stirred, and pH may be adjusted to 8 to obtain an aqueous phase.

The complexing agent refers to a compound that forms a stable complex with metal ions. In the inverse emulsion polymerization, the complexing agent may chelate with iron, calcium, magnesium, and other metal ions to reduce the effect of the metal ions on the polymerization.

In some embodiments, the complexing agent may be one of ethylene diamine tetraacetate, ethylenediamine tetramethylenephosphonate (EDTMP), sodium ammonia triacetate, and diethylenetriamine pentacarboxylate, and a mass of the complexing agent may account for 0.1% of the total mass of the water-in-oil emulsion formed in the operation S3.

In some embodiments, the complexing agent may be preferably ethylenediaminetetraacetic acid disodium.

S3: The aqueous phase may be slowly dropwise added to the oil phase while stirring at a speed of 600 r/min, dropwise adding may be finished within 30 min, and continuously stirred until water-in-oil emulsion is formed.

S4: The speed may be adjusted to 400-600 r/min, nitrogen may be introduced into the water-in-oil emulsion to remove oxygen, then an initiator may be added, and reaction temperature may be controlled to be within a range of 40° C.-60° C. to react for 2-10 h to obtain copolymer emulsion.

The initiator is one of important components of emulsion polymerization. A type, dosage, or the like, of the initiator may affect the performance quality of the emulsion. The initiator commonly used in the emulsion polymerization may include a free radical polymerization initiator, such as an azo initiator, or the like.

The azo initiator refers to a free radical initiator that contains an azo group in molecules. The azo initiator may be classified into an oil-soluble azo initiator and a water-soluble azo initiator based on a solubility of the azo initiator.

In some embodiments, the initiator used in the preparation of the high-temperature-resistant deep penetration molecular membrane acid copolymer may be the water-soluble azo initiator or a redox system including persulfate and sodium hydrogen sulfite.

The water-soluble azo initiator is a type of azo initiator obtained by introducing hydrophilic groups to the molecules of the oil-soluble azo initiator such as azobisisobutyronitrile (AIBN), which is soluble in water. The water-soluble azo initiator has high initiation efficiency, lower dosage, and fewer residue content compared with general azo initiators.

In some embodiments, the initiator may be preferably the water-soluble azo initiator including one of azodiisobutyl-amidine hydrochloride, azodiisobutylimidazoline hydrochloride, azodicyanovaleric acid, and azodiisopropylimidazoline, and further preferably the azodiisobutylamidine hydrochloride.

In some embodiments, a mass of the initiator may account for 0.2-0.5% of the total mass of the monomers. In some embodiments, a mass of the initiator may account for 0.2%, 0.3%, 0.4%, and 0.5%, preferably 0.4% of the total mass of the monomers.

In some embodiments, temperature of the polymerization may be within a range of 40° C.-60° C.

In some embodiments, the temperature of the polymerization may be 40° C., 45° C., 50° C., 55° C., and 60° C., preferably 55° C.

In some embodiments, reaction time of the polymerization may be within a range of 2-10 h.

In some embodiments, the reaction time of the polymerization may be 2 h, 4 h, 6 h, 8 h, and 10 h, preferably 8 h.

One or more embodiments of the present disclosure provide an application of a high-temperature-resistant deep penetration molecular membrane acid copolymer prepared by the preparation method. Copolymer emulsion may be used as a molecular membrane agent. The molecular membrane agent may be added to an acid solution to prepare molecular membrane acid (the molecular membrane acid copolymer).

In some embodiments, the molecular membrane agent (the copolymer emulsion) prepared in the operation S4 may be used directly to prepare the molecular membrane acid.

In some embodiments, the molecular membrane agent may be added to the acid solution to prepare the molecular membrane acid. A mass percentage concentration of the molecular membrane agent may be within a range of 1%-4.0%.

In some embodiments, the molecular membrane agent may be added to the acid solution to prepare the molecular membrane acid. The mass percentage concentration of the molecular membrane agent may be 1.0%, 1.5%, 2.0%, 3.0%, and 4.0%, preferably 3.0%.

Acidizing the stratum with a retarded acid system needs to consider a temperature condition of the stratum to achieve the optimal acidizing effect and ensure the safety and effectiveness of the operation.

The high-temperature-resistant deep penetration molecular membrane acid copolymer provided in one or more embodiments of the present disclosure may be resistant to a temperature within a range of 90° C.-180° C.

In some embodiments, the high-temperature-resistant deep penetration molecular membrane acid copolymer may be resistant to the temperature of 90° C., 120° C., 140° C., 160° C., and 180° C. An optimal resistance temperature of high-temperature-resistant deep penetration molecular membrane acid copolymer may be 90° C.

Figure 2:
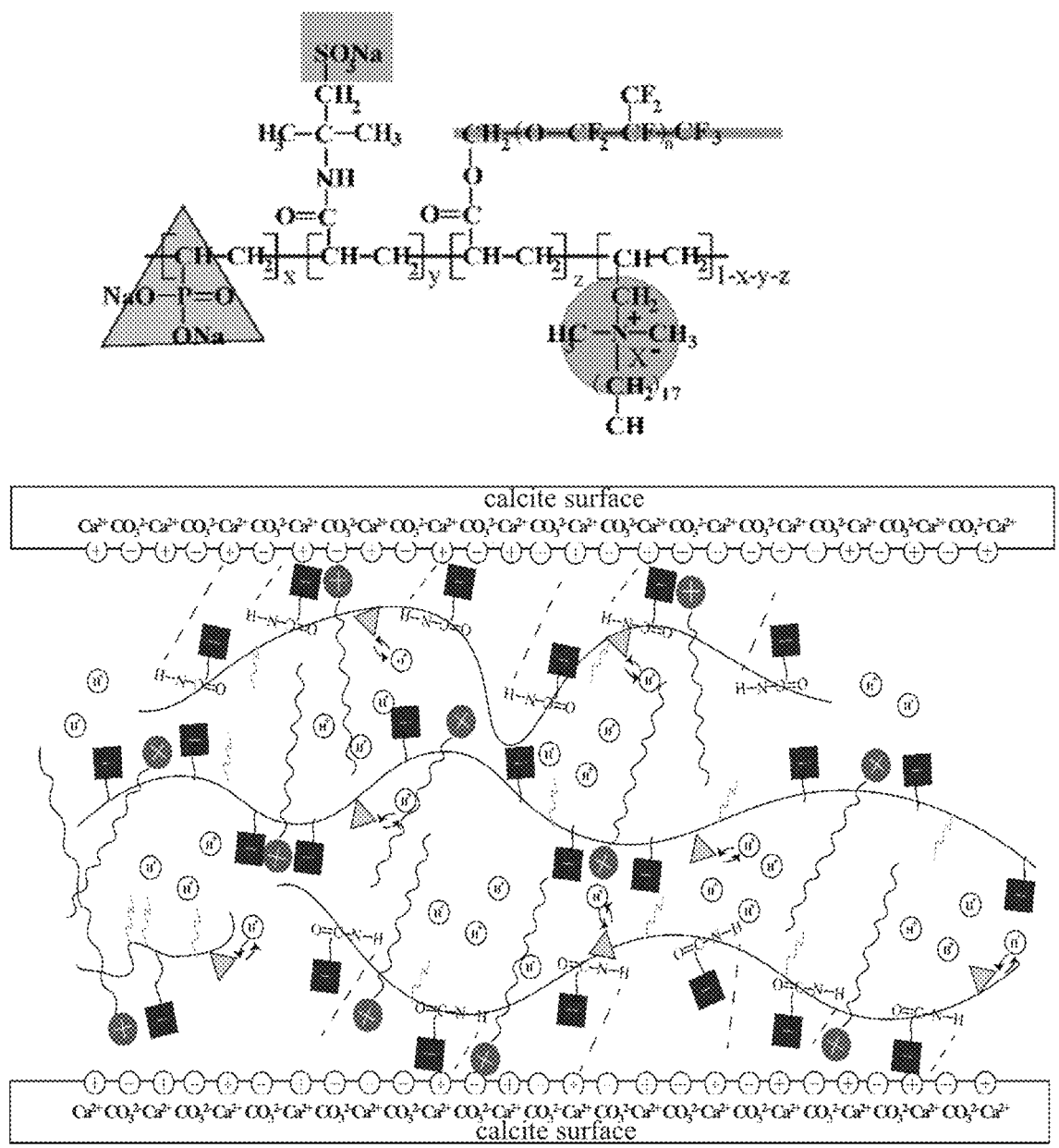
FIG. 2 is a schematic diagram illustrating an overall action of molecules of a molecular membrane acid copolymer according to some embodiments of the present disclosure.

The embodiments of the present disclosure include but are not limited to the following technical effects. (1) The copolymer emulsion provided in the embodiments of the present disclosure is copolymerized through four functional monomers as the molecular membrane agent to be added to the acid solution to form the molecular membrane acid; after the molecular membrane acid is injected into the stratum, when the molecular membrane agent (i.e., the copolymer emulsion) in the molecular membrane acid contacts with the carbonate reservoir, the N—H groups in the molecules form hydrogen bonds with the metal ions on the surface of the ore, and the sulphonic acid groups form ion-pair interactions with the metal ions (see FIG. 1 (b)); in addition, the quaternary ammonium cations in the molecules act on the $CO_3^{2-}$ sites by electrostatic adsorption, which synergistically form a retarded membrane on the rock surface (see FIG. 1 (a)); the fluorine-containing groups in the molecular chains and the long carbon chain hydrophobic group form a high-temperature acid-resistant retardant layer to prevent $H^+$ front contacting with the rock (see FIG. 1 (d)); and the phosphate groups retard the acid rock reaction rate by capturing a portion of $H^+$, and releases the portion of $H^+$ when an acid concentration decreases, realizing a buffering effect (see FIG. 1 (c)); (2) under the dual effect of the high-temperature-resistant hydrophobic retardant layer and the slow release of $H^+$, the molecular membrane acid exhibits the characteristics of high temperature retardation capability and deep penetration, and the action mechanism of the entire copolymer molecule is shown in FIG. 2; (3) the fluorine-containing tail chains and the alkyl hydrophobic chains of the copolymer emulsion provided in the embodiments of the present disclosure form hydrophobic micro-regions in the solution, which form special elastic aggregates at a certain concentration, significantly reducing the energy dissipation of the fluid under high shear, and realizing a good resistance reduction effect; and (4) the copolymer emulsion provided in the embodiments of the present disclosure has low molecular weight and low residue content, and the copolymer emulsion is used as the molecular membrane agent of the molecular membrane acid, so that the formed molecular membrane acid has the advantages of wide adaptability range of temperature, high retardance capacity without using a composite resistance reduction agent, high resistance reduction without gel breakage, low residue content, etc.

The high-temperature-resistant deep penetration molecular membrane acid copolymer and the preparation method thereof provided by embodiments of the present disclosure are further illustrated below by specific examples.

EXAMPLE

Example 1: Preparation of a High-Temperature-Resistant Deep Penetration Molecular Membrane Acid Copolymer A preparation method of the high-temperature-resistant deep penetration molecular membrane acid copolymer of Example 1 comprised the following operations.

(1) 10 # white oil, octadecyl dimethylallyl ammonium chloride, and dipolyfluoroether acrylate were added to a three-neck flask, stirred and dispersed evenly, a compound emulsifier composed of span-80 and OP-10 in a mass ratio of 4:1 was added and stirred until the compound emulsifier was fully dissolved to obtain an oil phase. (2) Monomer 2-acrylamido-2-methylpropanesulphonic acid, vinyl phosphonic acid, a complexing agent EDTA-2Na, and distilled water were mixed and pH was adjusted to 8 with a sodium hydroxide solution, and an obtained mixed solution was an aqueous phase. (3) Stirring was started and a stirring speed was controlled to be 600 r/min, the aqueous phase was slowly dropwise added to the oil phase, dropwise adding was finished within 30 min, and stirring was continued for 1 h to prepare emulsion, wherein a total mass of monomer accounted for 34.16% of a total mass of the entire emulsion, molar ratios of the 2-acrylamido-2-methylpropanesulphonic acid to the vinyl phosphonic acid to octadecyl dimethylallyl ammonium chloride to the dipolyfluoroether acrylate was 78:21.3:0.2:0.5, an amount of the compound emulsifier accounted for 5% of the total mass of the entire emulsion, a mass of EDTA-2Na accounted for 0.1% of the total mass of the entire emulsion, a mass of the white oil accounted for 38.4% of the total mass of the entire emulsion, and the remaining was the distilled water. (4) After emulsification, the speed was adjusted to 500 r/min, nitrogen was introduced for 30 min, heated to 50° C., and an initiator azodiisobutylamidine hydrochloride solution dissolved in the distilled water in advance was dropwise added, an amount of the initiator accounting for 0.3% of the total mass of the monomer, and the reaction was carried out for 6 h to obtain copolymer emulsion. The obtained copolymer emulsion obtained separated with methanol/acetone, washed, filtered, and pulverized to obtain white solid powder and dried to constant weight.

Figure 3:
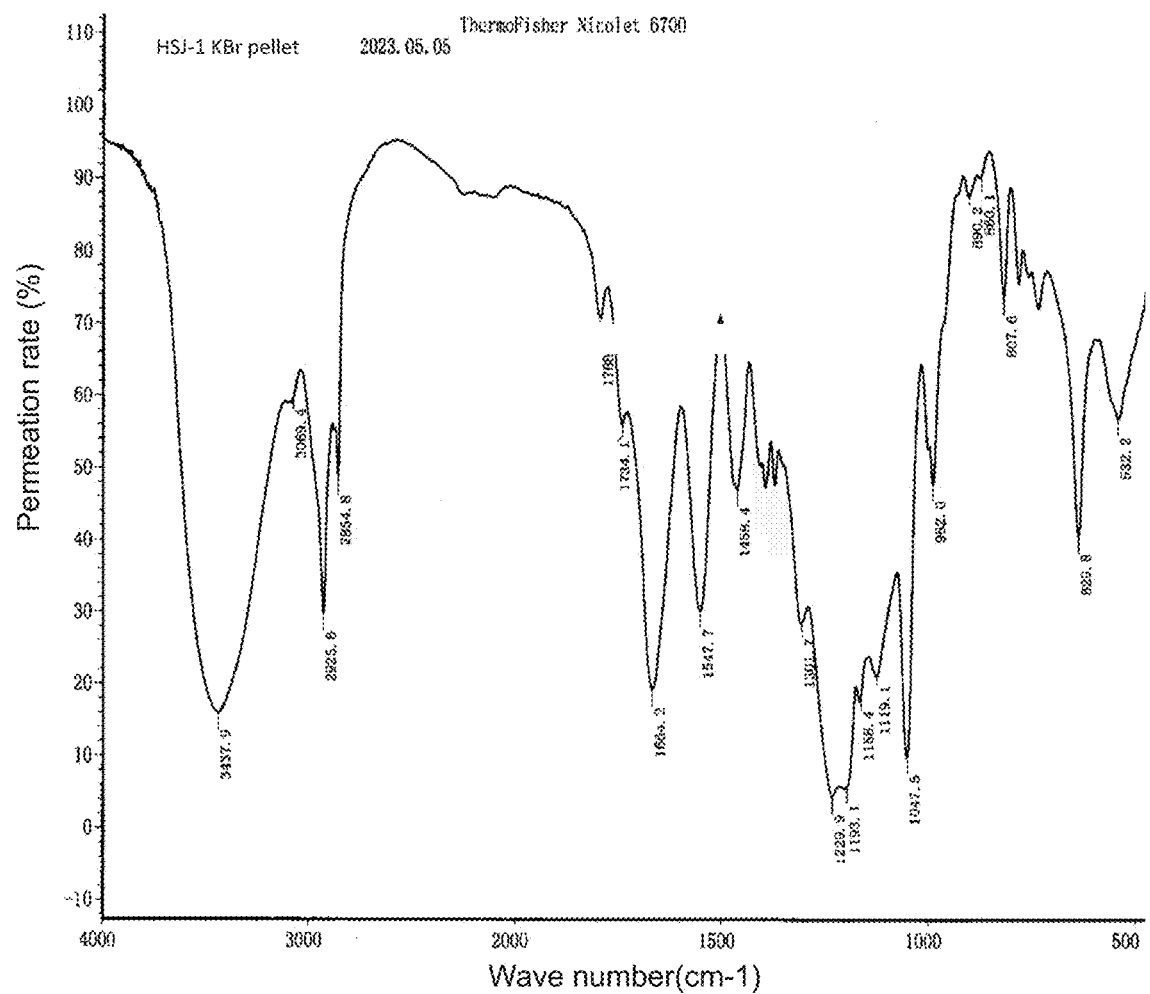
FIG. 3 is a schematic diagram illustrating an infrared spectral characterization of a molecular membrane acid copolymer prepared according to Example 1 of the present disclosure.

The copolymer obtained in Example 1 was subjected to infrared spectrogram determination using a potassium bromide (KBr) pellet technique, and obtained results were shown in FIG. 3. From FIG. 3, a Fourier Transform Infrared Spectroscopy (FTIR) spectrum shown a stretch vibration absorption peak of —NH at 3437 cm$^{-1}$, asymmetric absorption peaks of —CH$_3$ and —CH$_2$— at 2925 cm$^{-1}$, an symmetric vibration absorption peak of —CH$_2$— at 2856 cm$^{-1}$, a characteristic absorption peak of C=O in an amide group at 1664 cm$^{-1}$, a stretch vibration absorption peak of —COO— at 1547.7 cm$^{-1}$, a characteristic peak of a dimethyl group bonded to —N$^+$ at 1458 cm$^{-1}$, a C—F characteristic absorption peak of a strong absorption peak at 1229 cm$^{-1}$, a stretch vibration peak of C—O at 1119 cm$^{-1}$, and bending vibration peaks of —S—O at 1047 cm$^{-1}$ and 982 cm$^{-1}$. Therefore, it can be inferred that the copolymer molecule is consistent with a target structure.

Figure 4:
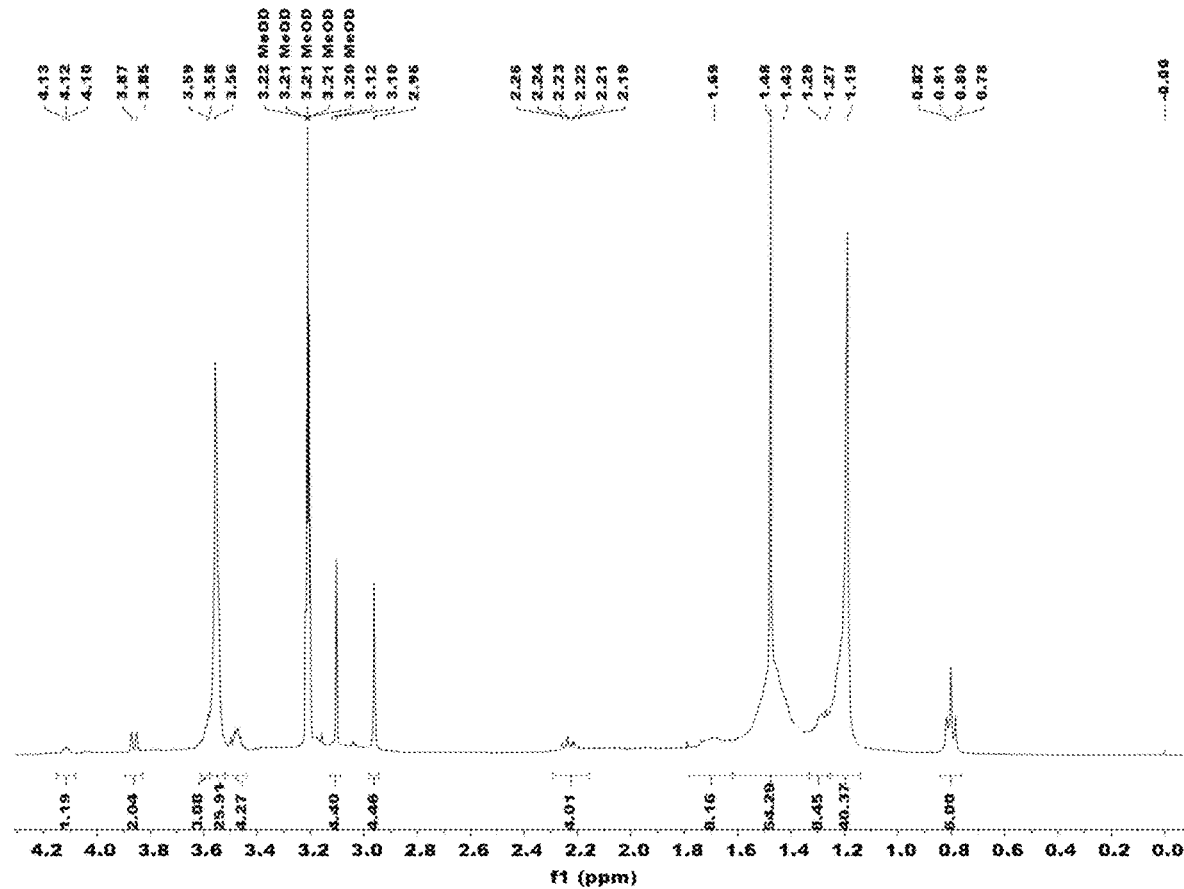
FIG. 4 is a schematic diagram illustrating a nuclear magnetic resonance (NMR) hydrogen spectrum of a molecular membrane acid copolymer prepared according to Example 1 of the present disclosure.
Figure 5:
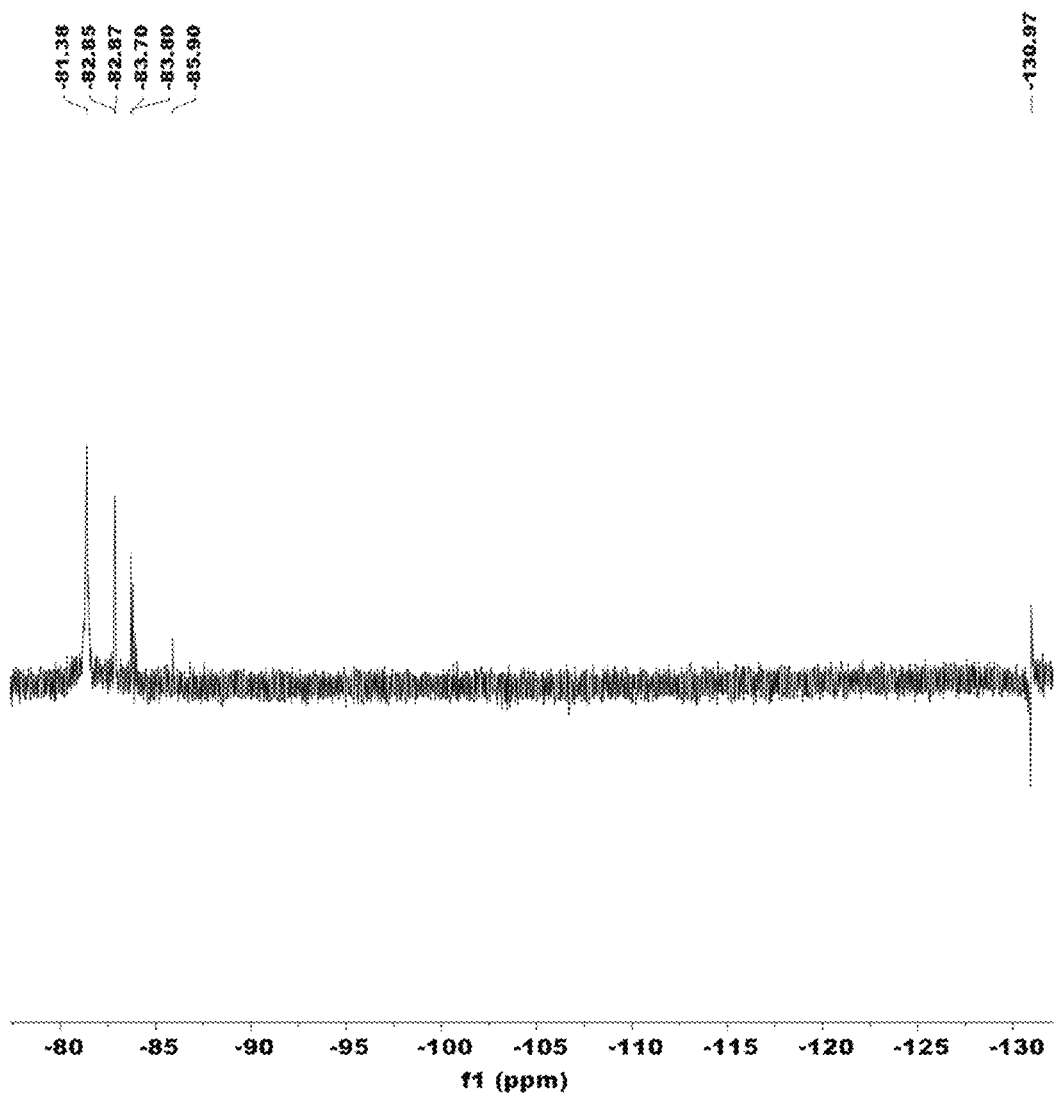
FIG. 5 is a schematic diagram illustrating an NMR fluorine spectrum of a molecular membrane acid copolymer prepared according to Example 1 of the present disclosure.
Figure 6:
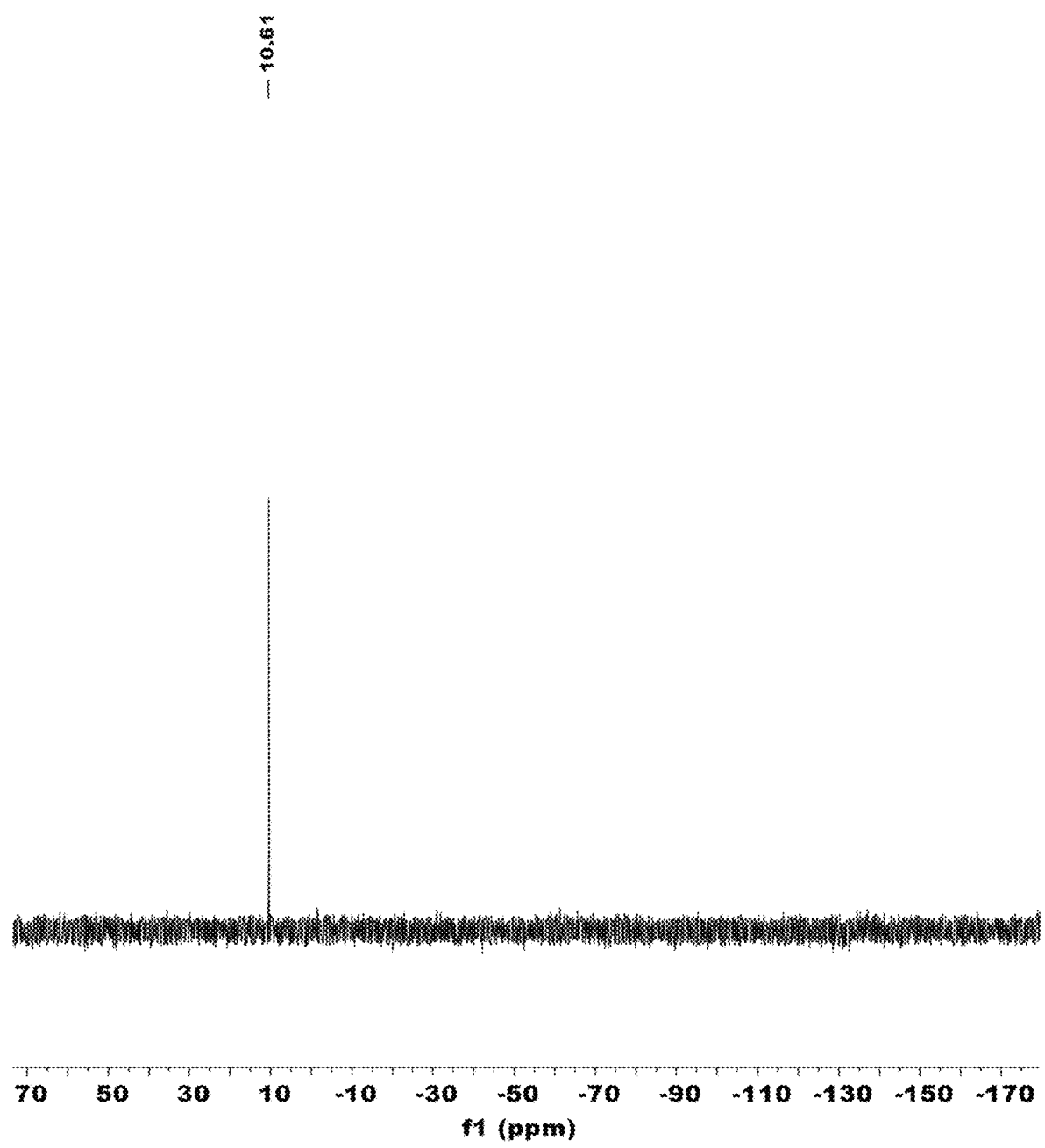
FIG. 6 is a schematic diagram illustrating an NMR phosphorus spectrum of a molecular membrane acid copolymer prepared according to Example 1 of the present disclosure.

The copolymer obtained in Example 1 was analyzed using NMR spectroscopy to obtain an NMR spectrum. FIG. 4 illustrates an NMR hydrogen spectrum. FIG. 5 illustrates an NMR fluorine spectrum. FIG. 6 illustrates an NMR phosphorus spectrum. In FIG. 4, δ=0.80 was a proton peak on end-site saturated carbon, δ=1.48 and δ=1.19 were peaks on methylene hydrogen, and δ=3.58, 3.10, and 2.23 were peaks on methine hydrogen. From the NMR fluorine spectrum, a chemical shift 0=130.97 ppm belonged to difluoromethylene connected to monofluorocarbon atoms and oxygen atoms in perfluoropolyether, and a chemical shift δ=−85.90--81.38 ppm was remaining fluorine atom signals. From the NMR phosphorus spectrum, a chemical shift δ=10.61 was a phosphorus atom signal of —PO$_3$Na$_2$. It can be inferred that the copolymer molecule is consistent with the target structure.

Figure 7:
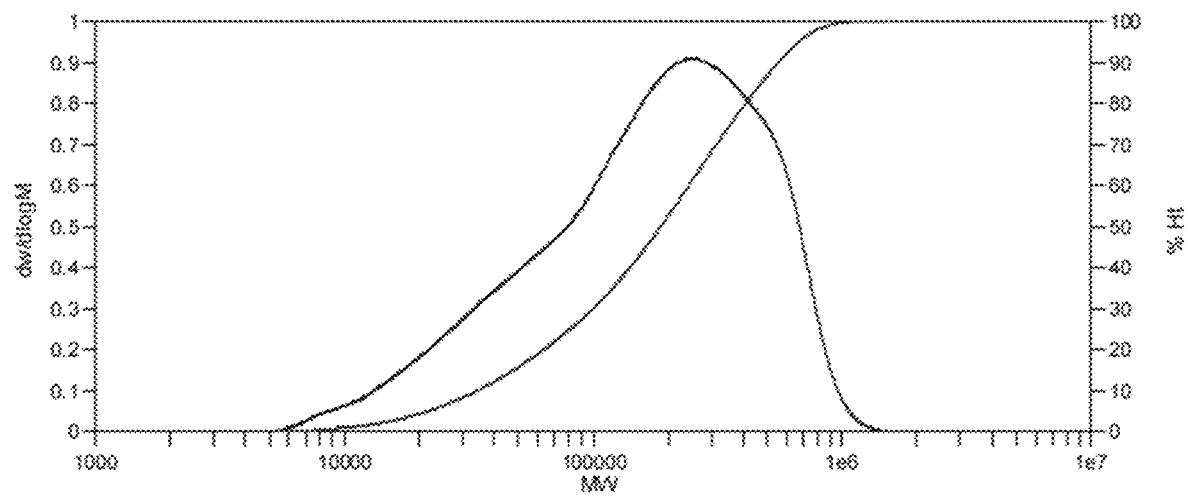
FIG. 7 is a schematic diagram illustrating a gel permeation chromatography molecular weight characterization of a molecular membrane acid copolymer prepared according to Example 1 of the present disclosure.

Molecular weight of the copolymer obtained in Example 1 was characterized using gel permeation chromatography. An obtained purified copolymer was dissolved in a 2 mol/L sodium nitrate solution to prepare a 2000 mg/L solution. The molecular weight of the copolymer was tested using Agilent 1260 gel permeation chromatography. Measurement results were shown in Table 1 and FIG. 7.

TABLE 1

Results of molecular weight characterization of copolymer obtained in Example 1

| $M_n$ | $M_w$ | $M_p$ | $M_z$ | $M_{z+1}$ | PD |
|---|---|---|---|---|---|
| 74857 | 230305 | 268860 | 412643 | 553054 | 3.0766 |

As shown in Table 1, a number-average molecular weight $M_n$ of the copolymer was 74857, a weight-average molecular weight Mw of the copolymer was 230305, a highest peak molecular weight $M_p$ of the copolymer was 268860, a Z-average molecular weight $M_z$ of the copolymer was 412643, a Z+1-average molecular weight $M_{z+1}$ of the copolymer was 553054, and a dispersion index PD of the copolymer was 3.0766 ($M_w/M_n$). The test results indicate that the polymerization reaction results of the polymerization method of the embodiments of the present disclosure are good, the desirable copolymer can be obtained, the molecular weight of the copolymer is not large, and the viscosifying capability is not very strong in the practical application process.

Example 2—Example 5: Study of the Effect of an Initiator Amount on the Retardation Performance of a Molecular Membrane Agent (i.e., Copolymer Emulsion)

On the basis of Example 1, the amount of the initiator was changed, as shown in Table 2.

Products obtained from the synthesis of Example 2-Example 5 and Example 1 were tested as follows.

According to the oil and gas industry standard SY/T 6526-2019 for determining the dynamic reaction rate between hydrochloric acid and carbonate rock, the obtained copolymer emulsion was evaluated and the reduction rate of the acid rock reaction rate was calculated. The specific tests were as follows.

I. A calcite core was washed and dried to constant weight, and diameters of end surfaces of a rock sample in three directions were tested to be accurate of 0.01 mm and averaged, and an area S was calculated.

II. A hydrochloric acid solution with a mass fraction concentration of 20% was prepared according to method 6.2.4 in SY/T 6526-2019 and divided into two parts, one of the two parts of the hydrochloric acid solution was used as blank hydrochloric acid, and the other of the two parts of the hydrochloric acid solution was added to the prepared molecular membrane agent (the copolymer emulsion) to form molecular membrane acid, wherein the formulation of the molecular membrane acid was 20% hydrochloric acid+3% molecular membrane agent, i.e., a ratio of a mass of the molecular membrane agent to a mass of the hydrochloric acid solution was 3%.

III. 500 mL of the molecular membrane acid prepared in the operation II was taken with reference to methods 7 and 8 in SY/T 6526-2019 to set temperature to 160° C., pressure was kept at 7 MPa, the speed was 500 r/min, and reaction time was set to 180 s. An acid concentration was determined before and after the reaction of 180 s, and an average acid rock reaction rate J1 was calculated.

IV. 500 mL of the blank hydrochloric acid prepared in the operation II was taken, and the acid concentration before and after the 180 s acid-rock reaction of the blank hydrochloric acid was determined according to the same test method described above, and an average acid-rock reaction rate $J_0$ was calculated.

The reduction rate of the acid rock reaction rate of the molecular membrane acid was calculated with the following formula:

$$R(\%) = \frac{J_0 - J_1}{J_0} \times 100$$

Where: R denotes the reduction rate of the acid rock reaction rate in %; $J_0$ denotes the acid rock reaction rate of the blank hydrochloric acid in mol/(cm$^2$·s); and $J_1$ denotes the acid rock reaction rate of the molecular membrane acid in mol/(cm$^2$·s).

An acid rock dynamic reaction rate refers to a rate at which a chemical reaction occurs between the acid and the rock, and is usually affected by temperature, an acid type and concentration, rock properties, and reaction surface area. During acidization, the acid rock reaction rate is as low as possible. A faster acid rock reaction rate causes more corrosion in a near-well zone, while a deep reservoir that needs to be reformed is not reformed.

The reduction rate of the acid rock reaction rate refers to an extent to which the acid rock reaction rate is reduced under a specific condition, and is usually used as a measure of the extent to which a factor or condition affects the acid rock reaction rate.

Calculation results of Example 1-Example 5 were shown in Table 2.

TABLE 2

The reduction rate of acid rock reaction rate of the molecular membrane agent (i.e. the copolymer emulsion) obtained with different initiator amounts

| Example | Initiator addition (total monomer, %) | Reduction rate of acid rock reaction rate (%) |
|---|---|---|
| Example 1 | 0.3 | 40.11 |
| Example 2 | 0.1 | 20.12 |

TABLE 2-continued

The reduction rate of acid rock reaction rate of the molecular membrane agent (i.e. the copolymer emulsion) obtained with different initiator amounts

| Example | Initiator addition (total monomer, %) | Reduction rate of acid rock reaction rate (%) |
|---|---|---|
| Example 3 | 0.2 | 35.87 |
| Example 4 | 0.4 | 50.12 |
| Example 5 | 0.5 | 43.74 |

From the results of Table 2, it can be concluded that the optimal amount of the initiator in the preparation method of the molecular membrane agent of the embodiments of the present disclosure is 0.4% of the total amount of the monomer.

Example 6-Example 9: Study of the Effect of Polymerization Reaction Temperature on the Retardation Performance of a Molecular Membrane Agent (i.e., Copolymer Emulsion)

The same operations were followed as Example 4, the initiator amount was 0.4% of the total amount of the monomer. Only the reaction temperature was adjusted, and the adjustment was shown in Table 3. Products obtained from the synthesis of Example 6-Example 9 and Example 4 were tested as follows.

According to the same test method of Example 2-Example 5, the obtained molecular membrane agent was evaluated based on the oil and gas industry standard SY/T 6526-2019 for determining the dynamic reaction rate between hydrochloric acid and carbonate rock, and a reduction rate of an acid rock reaction rate was calculated. Calculation results were shown in Table 3. From Table 3, it can be concluded that the optimal reaction temperature for the polymerization of the embodiments of the present disclosure is 55° C.

TABLE 3

Reduction rate of the acid rock reaction rate of the molecular membrane agent obtained at different synthesis temperatures

| Example | Temperature (° C.) | Reduction rate of acid rock reaction rate (%) |
|---|---|---|
| Example 4 | 50 | 50.12 |
| Example 6 | 40 | 34.79 |
| Example 7 | 45 | 46.54 |
| Example 8 | 55 | 52.49 |
| Example 9 | 60 | 47.19 |

Example 10-Example 13: Study of the Effect of Reaction Time on the Retardation Performance of a Molecular Membrane Agent (i.e., Copolymer Emulsion)

The same preparation method was followed as Example 8, only the reaction time was adjusted, and the adjustment was shown in Table 4. Products obtained from the synthesis of Example 10-Example 13 and Example 8 were tested as follows.

According to the same test method as described above, the obtained molecular membrane agent was evaluated based on the oil and gas industry standard SY/T 6526-2019 for determining the dynamic reaction rate between hydrochloric acid and carbonate rock, and a reduction rate of an acid rock reaction rate was calculated. Calculation results were shown in Table 4. It can be seen that a difference in the reduction rates of the acid rock reaction rates of the molecular membrane agent corresponding to the polymerization of 8 h and 10 h of the polymerization method of embodiments of the present disclosure was very small, i.e., by extending the reaction time by two hours on the basis of 8 h, an increase in the reduction rate of the acid rock reaction rate was extremely small and almost negligible. Therefore, the optimal value of the polymerization reaction time was determined to be 8 h based on economic efficiency.

TABLE 4

Reduction rate of the acid rock reaction rate of the molecular membrane agent obtained with different reaction times

| Example | Reaction time (h) | Reduction rate of acid-rock reaction (%) |
|---|---|---|
| Example 8 | 6 | 52.49 |
| Example 10 | 2 | 31.11 |
| Example 11 | 4 | 40.29 |
| Example 12 | 8 | 55.12 |
| Example 13 | 10 | 55.77 |

Example 14-Example 22: Study of the Effect of Different Molar Ratios of Four Monomers on the Retardation Performance of a Molecular Membrane Agent (i.e., Copolymer Emulsion)

The same preparation method was followed as Example 12, only the molar ratio of the monomer was adjusted, and the adjustment of the molar ratio was shown in Table 5. Products obtained from the synthesis of Example 14-Example 22 and Example 12 were tested as follows.

Referring to the same test method mentioned above, the obtained molecular membrane agent was evaluated based on the oil and gas industry standard SY/T 6526-2019 method for determining the dynamic reaction rate between hydrochloric acid and carbonate rock, and the reduction rate of the acid rock reaction rate was calculated. Calculation results were shown in Table 5. It can be seen that the optimal molar ratio is the molar ratio of the monomer corresponding to Example 15:2-acrylamido-2-methylpropanesulphonic acid: vinyl phosphonic acid: octadecyl dimethylallyl ammonium chloride:perfluoropolyether acrylate=88:11.3:0.2:0.5.

TABLE 5

Reduction rate of the acid rock reaction rate of the molecular membrane agent synthesized with different molar ratios of monomers

| Example | 2-acrylamido-2-methylpropanesulphonic acid: vinyl phosphonic acid:octadecyl dimethylallyl ammonium chloride: perfluoropolyether acrylate | Total mass of monomer (% of total mass of emulsion) | Reduction rate of acid rock reaction rate (%) |
|---|---|---|---|
| Example 12 | 78:21.3:0.2:0.5 | 34.16 | 55.12 |
| Example 14 | 82:17.3:0.2:0.5 | 35.12 | 63.72 |
| Example 15 | 88:11.3:0.2:0.5 | 36.56 | 67.18 |
| Example 16 | 92:7.3:0.2:0.5 | 37.52 | 59.88 |
| Example 17 | 98:1.3:0.2:0.5 | 38.96 | 54.24 |
| Example 18 | 88:11.3:0.1:0.6 | 36.59 | 63.13 |
| Example 19 | 88:11.3:0.3:0.4 | 36.54 | 65.37 |
| Example 20 | 88:11.3:0.4:0.3 | 36.51 | 62.17 |
| Example 21 | 88:11.3:0.5:0.2 | 36.48 | 60.01 |
| Example 22 | 88:11.3:0.6:0.1 | 36.46 | 59.29 |

Example 23-Example 25: Study of the Effect of Different Compound Emulsifier Ratios on the Stability of a Molecular Membrane Agent (i.e., Copolymer Emulsion)

The same preparation method was followed as Example 15, only the ratio of the compound emulsifier was adjusted, and the adjustment of the ratio was shown in Table 6.

Products obtained from the synthesis of Example 23-Example 25 and Example 15 were tested as follows.

The obtained product was placed in a 45° C. water bath for 30 days to observe whether delamination or precipitation occurred; viscosity of the copolymer emulsion at 100 r/min was tested using a six-speed rotational viscometer with reference to Appendix A of SY/T5886-2018; referring to the method of Example 2-Example 5, the obtained molecular membrane agent was evaluated based on the oil and gas industry standard SY/T 6526-2019 for determining the dynamic reaction rate between hydrochloric acid and carbonate rock, and the reduction rate of the acid rock reaction rate was calculated. Calculation results were shown in Table 6. It can be concluded that the optimal ratio of the compound emulsifier is Span 80: OP-10-3:1.

TABLE 6

Viscosity and stability of molecular membrane agents prepared with different emulsifier ratios

| Example | Emulsifier ratio (Span 80: OP-10) | Emulsion viscosity (mPa·s) | State | Reduction rate of acid rock reaction rate (%) |
|---|---|---|---|---|
| Example 15 | 4:1 | 128.0 | stable | 67.18 |
| Example 23 | 1:1 | 96.3 | delaminated | 45.37 |
| Example 24 | 2:1 | 151.2 | stable | 66.80 |
| Example 25 | 3:1 | 145.2 | stable | 69.55 |

Example 26-Example 28: Study of the Effect of Different Amounts of Compound Emulsifier on the Stability of a Molecular Membrane Agent (i.e., Copolymer Emulsion)

The same preparation operations were followed as in Example 25, and only the amount of the compound emulsifier was adjusted. The adjustment of the amount was shown in Table 7.

Products obtained from the synthesis of Example 26-Example 28 and Example 25 were tested as follows.

The obtained product was placed in a 45° C. water bath for 30 days to observe whether delamination and precipitation occurred; viscosity of the copolymer emulsion at 100 r/min was tested using a six-speed rotational viscometer with reference to Appendix A of SY/T5886-2018; referring to the method of Example 2-Example 5, the obtained molecular membrane agent was evaluated based on the oil and gas industry standard SY/T 6526-2019 for determining the dynamic reaction rate between hydrochloric acid and carbonate rock, and the reduction rate of the acid rock reaction rate was calculated. Calculation results were shown in Table 7. It can be concluded that the optimal amount of the compound emulsifier is 4%.

TABLE 7

Viscosity and stability of molecular membrane agents prepared with amounts of different emulsifier

| Example | Amount of emulsifier (% of total mass of emulsion) | Viscosity of emulsion (mPa-s) | State | Reduction rate of acid rock reaction rate (%) |
|---|---|---|---|---|
| Example 25 | 5 | 197.1 | stable | 69.55 |
| Example 26 | 2 | 97.2 | poor | 33.11 |
| Example 27 | 3 | 102.6 | partially precipitated, unstable | 60.74 |
| Example 28 | 4 | 151.2 | stable | 73.45 |

Example 29-Example 33: Study of the Effect of the Concentration of a Molecular Membrane Agent (i.e., Copolymer Emulsion) on the Retardation Performance Based on Example 28

In Table 7, the concentration of the copolymer emulsion corresponding to Example 28 in a hydrochloric acid solution was 3.0%. In order to study the effect of the concentration of the copolymer emulsion in the hydrochloric acid on the retardation performance, different parts by weight of the copolymer emulsion prepared in Example 28 were added to hydrochloric acid with a mass concentration of 20% to prepare molecular membrane acids with different concentrations. The concentrations of the copolymer emulsion in the hydrochloric acid solution (i.e., a ratio of a mass of the copolymer emulsion to a mass of the hydrochloric acid solution) were 0.5%, 1%, 1.5%, 2.0%, and 4.0%, respectively, thereby forming Example 29, 30, 31, 32, and 33, respectively.

Referring to the test method of Example 2-Example 5, the obtained molecular membrane agent was evaluated based on the oil and gas industry standard SY/T 6526-2019 for determining the dynamic reaction rate between hydrochloric acid and carbonate rock, and the reduction rate of the acid rock reaction rate was calculated. Calculation results were shown in Table 8.

Tests were performed based on the provisions of determination of resistance reduction rate in Chapter 7.13.1.1 of SY/T 6376-2008, and the results were shown in Table 8.

It can be seen that when the amount of the molecular membrane agent in the embodiments of the present disclosure is greater than 1.5%, the reduction rate of the acid rock reaction rate increases slightly, but the resistance reduction rate still increases; when the amount of the molecular membrane agent is 3%, the reduction rate of the acid rock reaction rate reaches a relatively large value, and when the amount of the molecular membrane agent continues to increase, the increase in the reduction rate of the acid rock reaction rate can be ignored, and the resistance reduction rate reaches the maximum at this time. The comprehensive performance is optimal when 3% of the molecular membrane agent is added to the hydrochloric acid solution.

TABLE 8

Reduction rate of acid rock reaction rate for different concentrations of molecular membrane acid

| Example | Concentration of molecular membrane agent (%) | Reduction rate of acid rock reaction rate (%) | Resistance reduction rate (%) |
|---|---|---|---|
| Example 28 | 3.0 | 73.45 | 73.22 |
| Example 29 | 0.5 | 54.11 | 19.87 |
| Example 30 | 1.0 | 60.04 | 30.12 |
| Example 31 | 1.5 | 69.88 | 51.77 |
| Example 32 | 2.0 | 71.36 | 65.12 |
| Example 33 | 4.0 | 74.11 | 66.96 |

Example 34: Study of the Effect of Different Temperatures on the Reduction Rate of an Acid Rock Reaction Rate of a Molecular Membrane Acid System in the Embodiments of the Present Disclosure A hydrochloric acid solution with a mass concentration of 20% was taken, 3% of a molecular membrane agent of Example 28 was added to the hydrochloric acid solution, then 5% of a corrosion inhibitor LP-HS, 1% of a ferrous ion stabilizer LP-TW, 1% of a clay stabilizer LP-NW, 1% of an auxiliary discharging agent LP-ZPS and other additives used in the field were added, and mixed evenly to obtain molecular membrane acid to be stored for later use. An amount percentage of each additive herein, and an amount of each additive in the following Comparative Examples are referred to a ratio of a mass of each additive to a mass of the hydrochloric acid solution.

Figure 8:
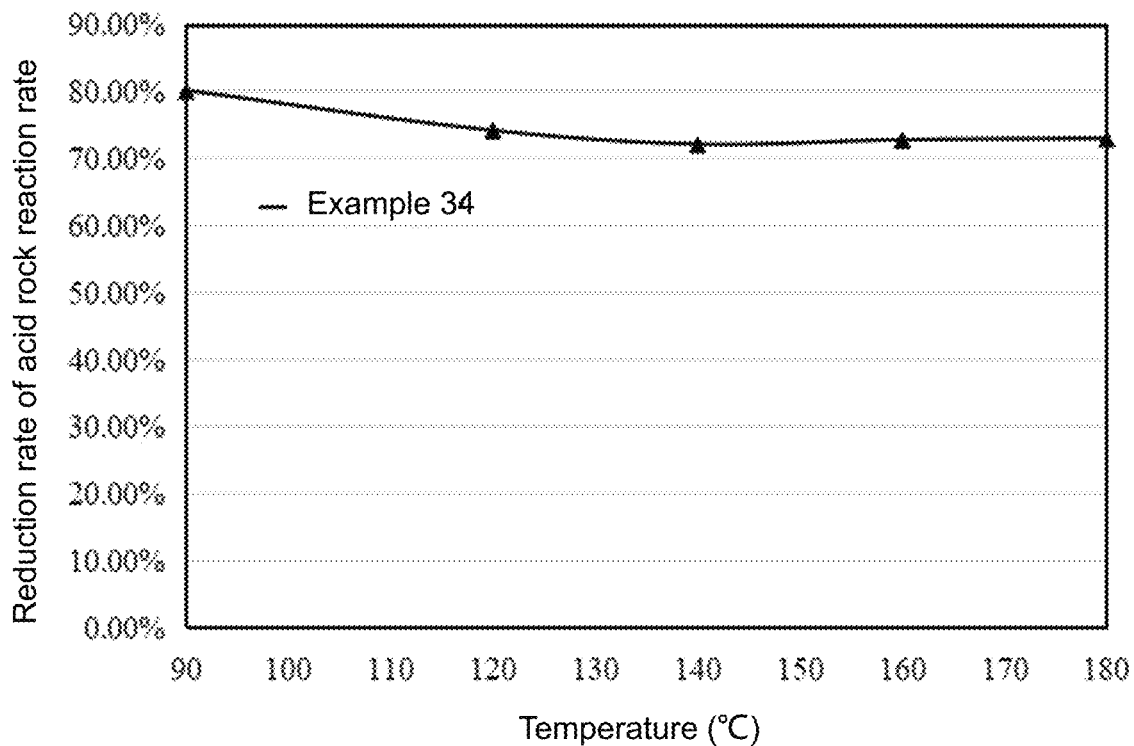
FIG. 8 is a diagram illustrating performances of reduction rates of acid rock reaction rates at different temperatures of molecular membrane acid according to Example 34 of the present disclosure.

Referring to the test method of Example 2-Example 5, the obtained molecular membrane agent was evaluated based on the oil and gas industry standard SY/T 6526-2019 for determining the dynamic reaction rate between hydrochloric acid and carbonate rock, and the reduction rate of the acid rock reaction rate was calculated by testing for 300 s at 90° C. and testing for 180 s and at the temperature of greater than 120° C. Calculation results were shown in Table 9 and FIG. 8. It can be seen that in the test of the reduction rate of the acid rock reaction rate in Example 34 at different temperatures, the reduction rate of the acid rock reaction rate was optimal at 90° C., and the reduction rate of the acid rock reaction rate changed little from 120° C. to 180° C., which was less affected by the temperature.

TABLE 9

Effect of different temperatures on the reduction rate of the acid rock reaction rate of the molecular membrane acid

| Example | Temperature (° C.) | Reduction rate of acid rock reaction rate (%) |
|---|---|---|
| Example 34 | 90 | 80.12 |
|  | 120 | 74.17 |
|  | 140 | 73.09 |
|  | 160 | 72.77 |
|  | 180 | 72.18 |

Example 35-Example 36 and Comparative Example 1-Comparative Example 3: Comparative Study of the Reduction Rate of the Acid Rock Reaction Rate of a Molecular Membrane Acid System of the Embodiments of the Present Disclosures and Other Retarded Acid Systems A hydrochloric acid solution with a mass concentration of 20% was taken, the molecular membrane agent of Example 28 was added based on the amount of the molecular membrane agent in Example 35-Example 36 in Table 10, then 4% of a corrosion inhibitor LP-HS, 1% of a ferrous ion stabilizer LP-TW, 1% of a clay stabilizer LP-NW, 1% of an auxiliary discharging agent for acidification LP-ZPS (fluorocarbon surfactant dual sub-class surfactant LP-ZPS, Manufacturer: Chengdu LEPS Technology Co.,) and other additives used in the field were added, and mixed evenly to obtain the molecular membrane acid to be stored for later use. An amount percentage of each additive herein, and an amount of each additive in the following Comparative Examples were referred to a ratio of a mass of each additive to a mass of the hydrochloric acid solution.

Comparative Example 1

A hydrochloric acid solution with a mass concentration of 20% was taken, and 4% of a corrosion inhibitor LP-HS, 1% of a ferrous ion stabilizer LP-TW, 1% of a clay stabilizer LP-NW, 1% of an auxiliary discharging agent for acidification LP-ZPS (a fluorocarbon surfactant dual sub-class surfactant LP-ZPS), and other additives used in the field were added, and mixed evenly to be stored for later use.

Comparative Example 2

A hydrochloric acid solution with a mass concentration of 20% was taken, and 4% of a corrosion inhibitor LP-HS, 1% of a ferrous ion stabilizer LP-TW, 1% of a clay stabilizer LP-NW, 1% of an auxiliary discharging agent for acidification LP-ZPS (a fluorocarbon surfactant dual sub-class surfactant LP-ZPS), and other additives used in the field were added, mixed evenly, and then 1% of a thickening agent for acidification polyacrylamide LP-JN (emulsion) was slowly added to obtain low viscosity gelling acid system to be stored for later use.

Comparative Example 3

A hydrochloric acid solution with a mass concentration of 20% was taken, and 4% of a corrosion inhibitor LP-HS, 1% of a ferrous ion stabilizer LP-TW, 1% of a clay stabilizer LP-NW, 1% of an auxiliary discharging agent for acidification LP-ZPS (a fluorocarbon surfactant dual sub-class surfactant LP-ZPS), and other additives used in the field were added, mixed evenly, and then 3% of a thickening agent for acidification polyacrylamide LP-JN (emulsion) was slowly added to obtain a high viscosity gelling acid system to be stored for later use.

The effect of Example 35-Example 36, Comparative Example 1-Comparative Example 3, etc., on the corrosion rate, the reduction rate of the acid rock reaction rate, and the residue content was tested as follows.

The corrosion rate was tested at 160° C. by taking the Example 35-Example 36 and Comparative Example 1-Comparative Example 3 based on the method specified in 6.1 of SY/T 5405-2019. The results were shown in Table 10.

Referring to SY/T 5886-2018 Appendix A, viscosities of Example 35-Example 36 and Comparative Example 1-Comparative Example 3 at 100 r/min were tested using a six-speed rotational viscometer. The results were shown in Table 10.

Referring to the test method of Example 2-Example 5, Example 35-Example 36 and Comparative Example 1-Comparative Example 3 at 160° C. were evaluated based on the oil and gas industry standard SY/T 6526-2019 for determining the dynamic reaction rate between hydrochloric acid and carbonate rock, and the reduction rate of the acid rock reaction rate was calculated. The results were shown in Table 10.

The residue content was tested based on the method specified in SY/T 5107-2016. The results were shown in Table 10.

TABLE 10

Comparison of Example 35-Example 36 with Comparative embodiment 1-Comparative embodiment 3

| Experimental group | Retarding agent and concentration thereof (%) | Corrosion rate g/(m²·h) | Reduction rate of acid rock reaction rate (%) | Viscosity (mPa-s) | Residue content (mg/L) |
|---|---|---|---|---|---|
| Comparative Example 1 | 0 | 37.82 | 0 | / | / |
| Comparative Example 2 | Thickening agent 1.0% | 39.88 | 12.81 | 9.3 | 62 |
| Comparative Example 3 | Thickening agent 3.0% | 46.11 | 66.78 | 27.3 | 478 |
| Example 35 | Molecular membrane agent 1.0% | 38.33 | 59.61 | 4.13 | 5.2 |
| Example 36 | Molecular membrane agent 3.0% | 40.78 | 72.77 | 9.18 | 19 |

From Table 10, it can be seen that by comparison the molecular membrane acid prepared by adding the molecular membrane agent to the acid solution with the gelling acid prepared by adding the thickening agent, the corrosion rates of the two acid systems met the standard of the oil industry; under the same concentration, the molecular membrane acid had a higher reduction rate of the acid rock reaction rate compared with that of the gelling acid, and the residue content of the molecular membrane acid was only 5%-10% of that of the gelling acid, which had obvious advantages in the retarding performance and the residue content; under the same viscosity, the reduction rate of the acid rock reaction rate of the molecular membrane acid was 6 times of that of the gelling acid. Therefore, the molecular membrane acid has excellent retarding performance and stronger penetration capacity during acidizing construction to achieve deep penetration effect, and enables the carbonate rock gas reservoirs to be communicated, thereby achieving a better development effect.

The foregoing is only a preferred embodiment of the present disclosure, and is not intended to limit the present disclosure, and any modifications, equivalent substitutions, and improvements, etc., made within the spirit and principles of the present disclosure shall be included in the scope of protection of the present disclosure.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures, or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A high-temperature-resistant deep penetration molecular membrane copolymer having the following structural formula:

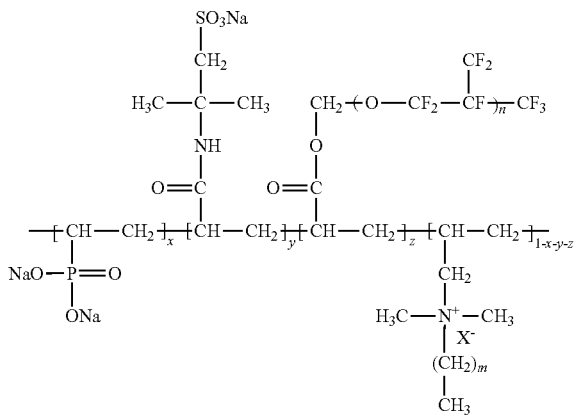

wherein x is within a range of 0.01-0.22, y is within a range of 0.78-0.98, z is within a range of 0.004-0.007, and x+y+z<1; X denotes one of CI, Br, and I, n denotes one of 1, 2, and 3, and m denotes one of 11, 13, 15, and 17.

2. The high-temperature-resistant deep penetration molecular membrane copolymer of claim 1, wherein X is CI, n is 2, and m is 17.

3. A preparation method of the high-temperature-resistant deep penetration molecular membrane copolymer of claim 1, comprising:
S1: mixing and stirring solvent oil, an emulsifier, alkyl dimethylallyl ammonium chloride, and perfluoropolyether acrylate to be dispersed homogeneously to obtain an oil phase;
S2: mixing and stirring 2-acrylamido-2-methylpropanesulphonic acid, vinyl phosphonic acid, a complexing agent, and distilled water, and adjusting pH to 8 to obtain an aqueous phase;
S3: slowly dropwise adding the aqueous phase to the oil phase while stirring at a speed of 600 r/min, finishing dropwise adding within 30 min, and continuously stirring until water-in-oil emulsion is formed; and S4: adjusting the speed to 400-600 r/min, introducing nitrogen into the water-in-oil emulsion to remove oxygen, then adding an initiator solution, and controlling reaction temperature to be within a range of 40° C.-60° C. to react for 2-10 h to obtain copolymer emulsion; wherein a molar percentage of each of four raw monomers is as follows:

78%-98% of 2-acrylamido-2-methylpropanesulfonic acid, 1%-22% of vinyl phosphonic acid, 0.4%-0.7% of perfluoropolyether acrylate, and 0.1%-0.3% of alkyl dimethylallyl ammonium chloride; wherein a sum of the molar percentages of the four raw monomers is equal to 100%;

the initiator is a water-soluble azo initiator or a redox system including persulfate and sodium hydrogen sulfite, and the initiator accounts for 0.2-0.5% of a total mass of the four monomers; and the emulsifier is an emulsifier blend composed of an emulsifier A and an emulsifier B in a mass ratio of (2-4):1, the emulsifier A is one of sorbitan monooleate, sorbitan monostearate, propylene glycol monostearate (BPMS), and propylene glycol monolaurate (BPML); the emulsifier B is one of sorbitan laurate, fatty alcohol polyoxyethylene ether, polyoxyethylene octyl phenol ether-10, polysorbate-20, and polysorbate-60; and a total mass of the emulsifier blend accounts for 4%-5% of a total mass of the water-in-oil emulsion.

4. The preparation method of claim 3, wherein an amount of the solvent oil accounts for 20%-40% of the total mass of the water-in-oil emulsion.

5. The preparation method of claim 3, wherein a total mass of the four monomers accounts for 34%-39% of the total mass of the water-in-oil emulsion.

6. The preparation method of claim 3, wherein the complexing agent is one of ethylene diamine tetraacetate, ethylenediamine tetramethylenephosphonate (EDTMP), sodium ammonia triacetate, and diethylenetriamine pentacarboxylate, and a mass of the complexing agent accounts for 0.1% of the total mass of the water-in-oil emulsion.

* * * * *